United States Patent [19]

Vairavan et al.

[11] Patent Number: 5,014,263
[45] Date of Patent: May 7, 1991

[54] ADAPTIVE ECHO-CANCELLER WITH DOUBLE-TALKER DETECTION

[75] Inventors: Kannan P. Vairavan; Paul McLeod, both of Austin, Tex.

[73] Assignee: Advanced Micro Devices, Inc., Sunnyvale, Calif.

[21] Appl. No.: 401,497

[22] Filed: Aug. 29, 1989

Related U.S. Application Data

[63] Continuation of Ser. No. 327,358, Mar. 23, 1989, abandoned, which is a continuation of Ser. No. 104,320, Oct. 2, 1987, abandoned.

[51] Int. Cl.$^5$ .............................................. H04B 3/23
[52] U.S. Cl. ................................... 370/32.1; 379/406; 379/411
[58] Field of Search ...................... 379/406, 410, 411; 370/32, 32.1

[56] References Cited

U.S. PATENT DOCUMENTS

| | | | |
|---|---|---|---|
| 3,465,106 | 9/1969 | Nagata et al. | 379/406 |
| 3,499,999 | 3/1970 | Sondhi | 379/411 X |
| 3,789,165 | 1/1974 | Campanella et al. | 379/411 |
| 3,889,108 | 6/1975 | Cantrell | 333/18 |
| 4,007,341 | 2/1977 | Sourgens et al. | 379/411 |
| 4,349,889 | 9/1982 | van den Elzen et al. | 364/724 |
| 4,464,545 | 8/1984 | Werner | 370/32.1 |
| 4,712,235 | 12/1987 | Jones, Jr. | 379/410 |
| 4,755,984 | 7/1988 | Ambrosio et al. | 370/32.1 |
| 4,757,527 | 7/1988 | Beniston et al. | 379/410 |

OTHER PUBLICATIONS

"Digital Echo Cancellation for Baseband Data Transmission", Verhoeckx et al., IEEE Transactions on Acoustics, Speech, and Signal Processing, vol. ASSP-27, No. 6, Dec. 1979, pp. 768-781.

Primary Examiner—James L. Dwyer
Assistant Examiner—M. Shehata
Attorney, Agent, or Firm—Foley & Lardner

[57] ABSTRACT

Method and apparatus are disclosed which provide echo-cancellation in subscriber line audio-processing circuits (SLACs) and modulator-demodulators (modems). The echo-canceller provides a response independent of the amplitude of an error signal representing the difference between the desired and generated signal. The convergence of the echo-cancelling is not influenced by the size of the error signal but only by its sign. In a preferred embodiment, a cannonic signed digit filter coefficient updating technique is used for a digital filter (10) implementing the echo-cancellation function. A double-talker detector is advantageously used in conjunction with the echo-canceller. Detection of "double-talker" near-end signals inhibits updating of the echo-canceller filter coefficients. Near-end signals are detected by an energy-averaging filter (26) which selectively samples (28) low-pass filtered signals received by the adaptive filter as received from the far-end talker and low-pass filtered signals received from the near-end talker. Near-end speech or signal is detected if the latter signal exceeds a predetermined function of the former signal.

5 Claims, 3 Drawing Sheets

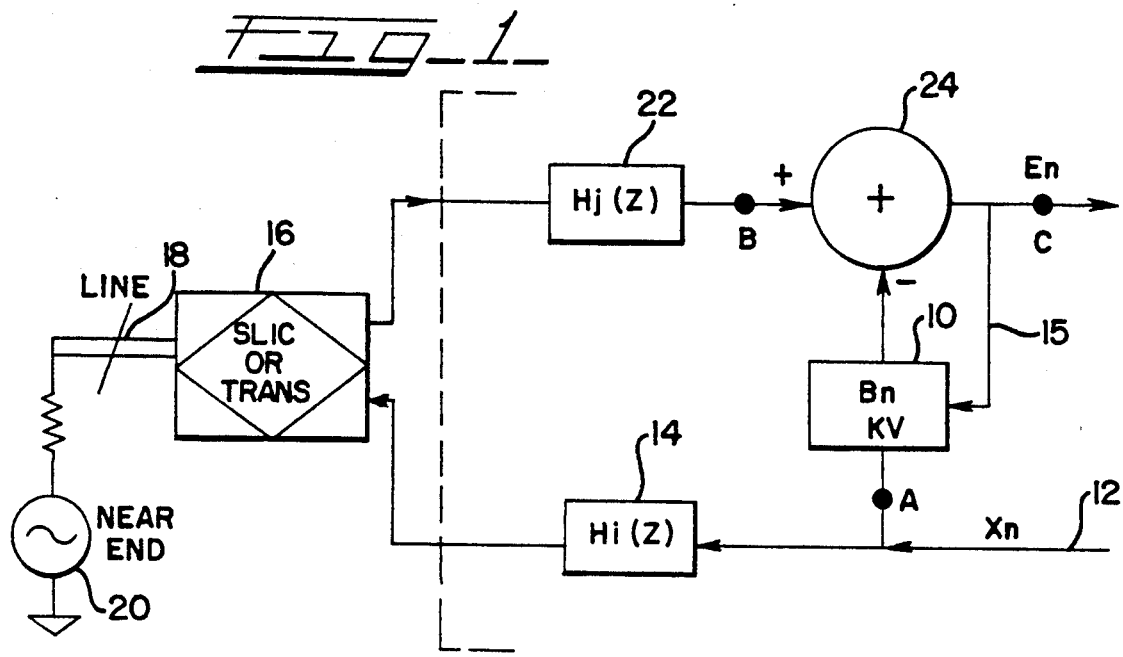
FIG_1
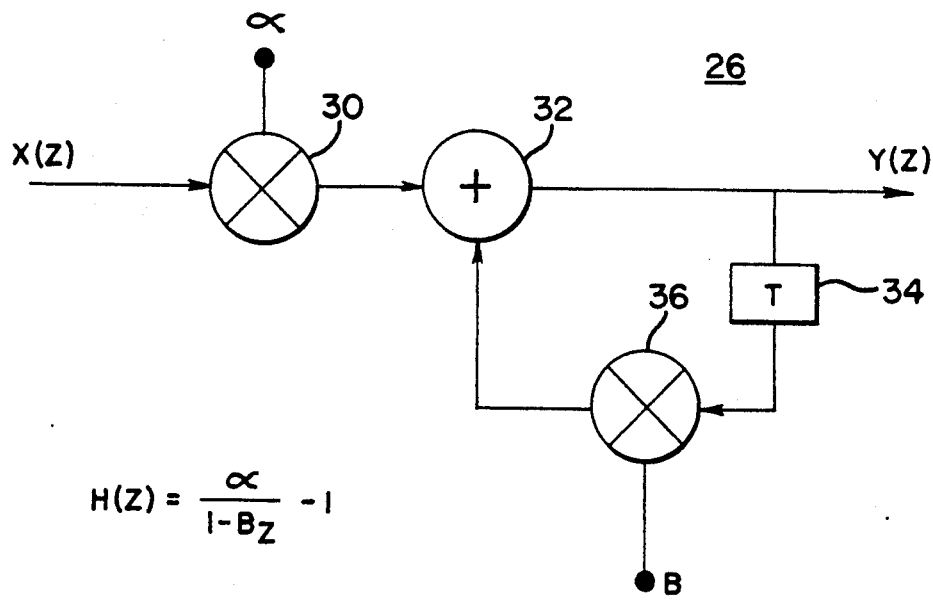
FIG_3
$$H(Z) = \frac{\alpha}{1-B_Z} - 1$$

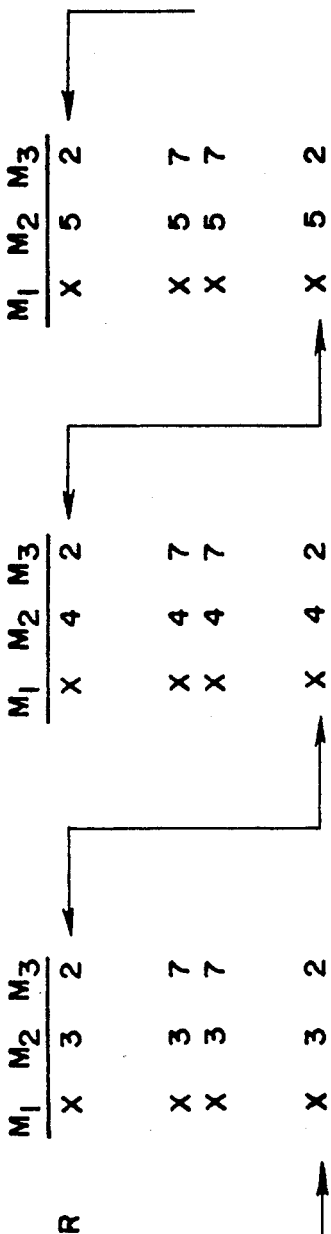
FIG. 4A.
TYPICAL SEQUENCE FOR CHANGING VALUES OF $C_2$ & $C_3$
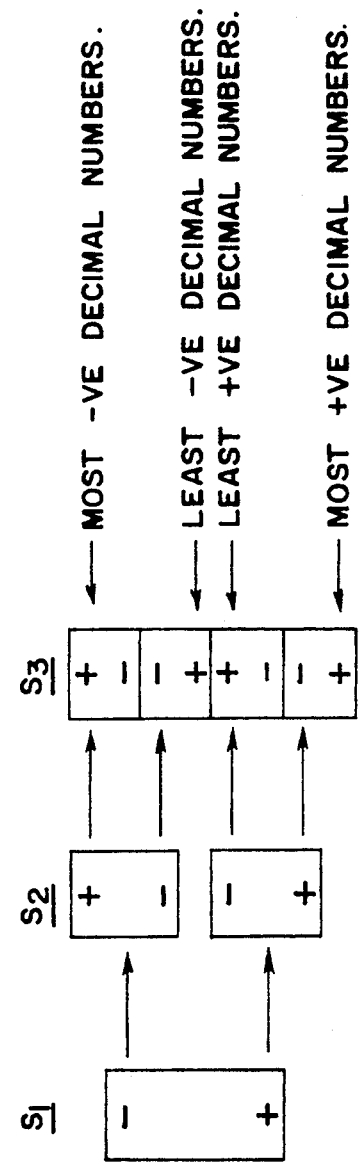
FIG. 4B.
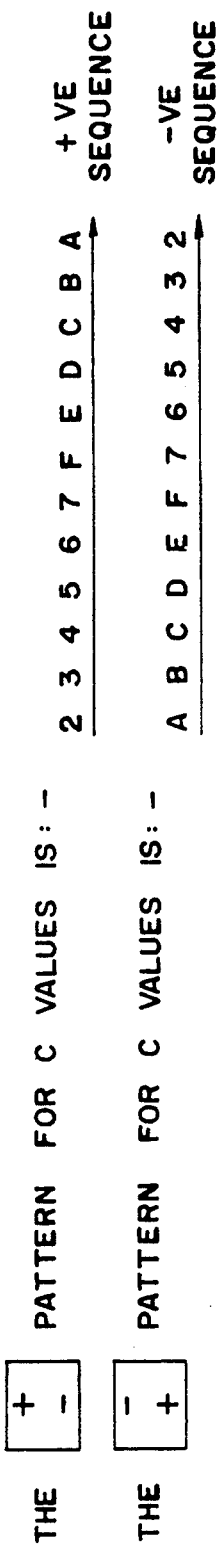

ADAPTIVE ECHO-CANCELLER WITH DOUBLE-TALKER DETECTION

This is a continuation of application Ser. No. 327,358 filed 3/23/89, now abandoned, which is a continuation of application Ser. No. 07/104,320 filed 10/2/87, abandoned.

CROSS-REFERENCE TO RELATED, CO-PENDING APPLICATION

Co-pending application of particular interest to the instant application in U.S. Ser. No. 368,113, filed June 16, 1989, which is a continuation of U.S. Ser. No. 052,091, filed May 18, 1987, now abandoned, on behalf of Kannan P. Vairavan and Paul McLeod entitled "Updating Canonic Signed Digit Filter Coefficients" and commonly-assigned with the instant application.

FIELD OF THE INVENTION

The present invention relates to digital filters and, more particularly, to an adaptive filter providing echo-cancellation, especially to such a filter having canonic signed digit filter coefficients, and advantageously used in conjunction with double-talker detection.

BACKGROUND OF THE INVENTION

Digital filters are used in adaptive circuits, such as adaptive subscriber line audio-processing circuits (SLACs), which require periodic updating of the filter coefficients. For example, a SLAC may employ a filter to cancel echos, or reflected signals, which occur if there is an impedance mismatch on the transmission lines interconnecting SLACs.

An adaptive filter continuously adjusts its coefficients to optimize the transfer function it implements. Without the adaption feature, a user must calculate a few sets of filter coefficients for the most commonly-encountered subscriber line characteristics and then choose the closest set of coefficients suited to the particular line used in the application. The selected set will not provide the best echo cancellation for instance, under all circumstances, especially if line impedance varies over time. By employing adaption, a user does not have to calculate any coefficients and at the same time gets a continuously-updated echo-cancellation function which can respond to changing line characteristics.

Digitally-encoded audio signals are commonly transmitted on networks employing SLACs. Accordingly, there is a need for adaptive digital filters which provide an echo cancellation function. Another application for digital filtering is in modulator-demodulators (Modems) used for transmission of digital data over telephone lines.

Because of procedures used during initial connection of SLACs and modems, echo-cancellers are deactivated for the duration of the initial establishment of the interconnection. Furthermore, the echo canceller must be deactivated if there is a "talker" at the near end of the interconnection. The adaptive filter must be prevented from updating filter coefficients during either of these circumstances. Thus, "double talker" detection is advantageously used in conjunction with an adaptive filter.

SUMMARY OF THE INVENTION

An adaptive digital filter is employed as an echo-canceller in the present invention. The echo canceller provides a response which is independent of the amplitude of the error signal representing the difference between the desired signal and the generated signal. Accordingly, the convergence of the echo-cancelling method is not influenced by the size of the error signal, but only by the sign of the error signal. In a preferred application, canonic signed digit filter coefficients are employed and a markedly improved learning curve is achieved for the echo-canceller of the present invention.

In another aspect of the invention, a double-talker detector is used to inhibit updating of the adaptive filter coefficients. Near end speech or signals are detected by using an energy-averaging filter. The energy-averaging filter samples low-pass filtered signals received by the adaptive filter as received from the far-end talker and low-pass filtered signals received from the near-end talker. Near-end speech or signal is detected if the latter signal exceeds a predetermined function of the former signal.

BRIEF DESCRIPTION OF THE DRAWINGS

FIG. 1 illustrates an adaptive digital filter employed as an echo-canceller.

FIG. 3 is a signal-flow diagram illustrating the transfer function to be implemented by the energy-averaging filter.

FIG. 4A is a diagrammatic illustration of the updating of filter tap coefficients with the present invention for a 3 nibble canonic signed digit format.

FIG. 4B is a diagrammatic illustration of the direction of movement through the filter of tap coefficients with the present invention for a 3 nibble canonic digit format.

DETAILED DESCRIPTION OF A PREFERRED EMBODIMENT

Figure 2:
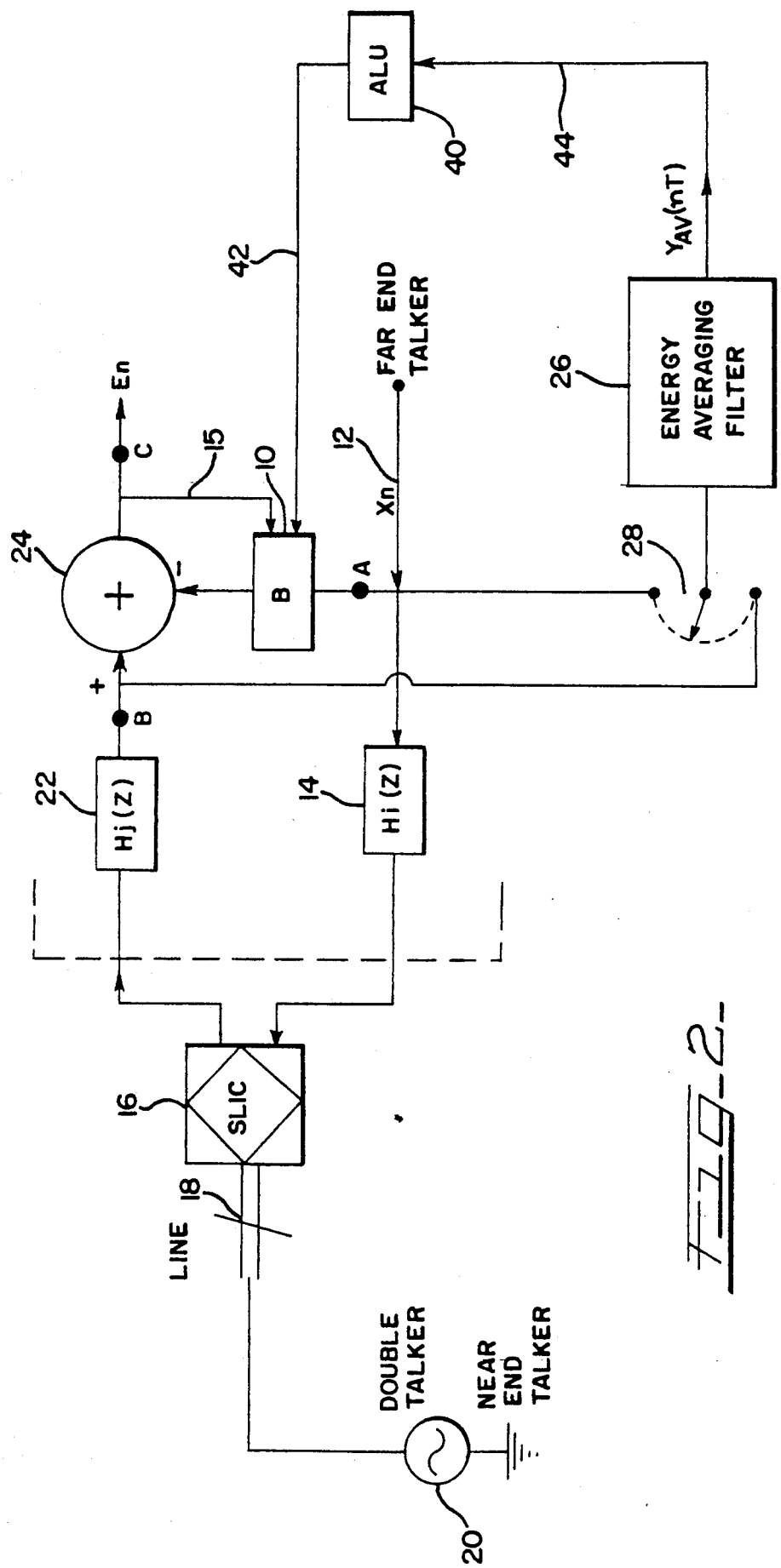
FIG. 2 illustrates employment of an energy-averaging filter in conjunction with the echo-cancelling filter of the instant invention.

The present invention employs a digital filter in an adaptive circuit. An adaptive circuit is one in which the filter coefficients are not fixed values, but are updated, i.e., incremented or decremented, frequently. In the present invention, the filter provides an echo-cancelling function, and accordingly, the filter must adapt to changes in transmission line conditions, operating voltages, etc.

FIG. 1 is a block diagram illustrating the use in a "near-end" transceiver of an adaptive digital filter 10 as an echo-canceller. The filter 10 is an N-tap finite impulse response (FIR) filter of a type known as discrete-time adaptive filter and generates an output signal $Y_n$ from a received input signal $X_n$, where n measures time intervals. After the nth iteration $$X_n = [x_n \, x_{n-1} \ldots x_{n-(N-1)}]^T$$

The filter 10 is characterized by a set of tap coefficients $$B_n = [b_{n_0} b_{n_1} \ldots b_{n(N-1)}]^T$$

which are updated each time interval.

The output signal at the nth time interval is related to the previous N inputs and the previous N filter coefficients by the matrix equation.

$$Y_n = X_n^T \cdot B_n \quad \text{(Equ. 1)}$$

An error signal, En, is computed by $$En = dn - Yn \qquad (Equ. 2)$$

where dn is the desired output signal to be generated by filter 10.

The object of updating the filter-coefficients is to minimize the error En in the shortest number of iterations. As described in the related, co-pending application, one method of coefficient updating is called a sign algorithm and is described by the equation $$Bn+1 = Bn + \Delta \cdot sign(Xn \cdot En) \qquad (Equ. 3)$$

where $\Delta$ is a predetermined incremental value.

One advantage of employing Equ. 3 to perform coefficient updating is that only addition and subtraction are required to perform an update. Accordingly, the updating is readily performed by an arithmetic logic unit (ALU). Furthermore, the sign function is readily ascertained by the so-called "exclusive-or" logic function, which is also readily performed by an ALU.

In a preferred embodiment, the value for $\Delta$ is non-linear and is chosen according to a canonic Signed Digit (CSD) algorithm.

The coefficient updating method of the present invention employs a canonic signed digit (CSD) binary encoding to represent the filter tap coefficients. The CSD encoding will use n binary coefficients C1, C2, . . . , Cn, each called a coefficient "nibble". Each binary coefficient having a shift portion Mi so that the decimal value of a filter tap coefficient A is related to its CSD encoding according to the formula $$A = [C1 * 2^{-M1}(1 \pm C2 * 2^{-M2}(1 \pm C3 * 2^{-M3}(1 \pm \ldots (1 \pm Cn * 2^{-Mn}) \ldots )] \qquad (3)$$

In general, if n nibbles are employed, the tap coefficient A takes on values from $+n$ to $-n$. To describe the CSD encoding, each coefficient Ci shall be taken to be a four-bit binary number consisting of a sign bit Si and a three-bit shift code Mi so that $Ci = SiMi$. Each nibble therefore is representable as a decimal number having a hexadecimal value 1, 2, . . . , 8, 9, A, B, C, D, E, F.

As will be explained hereinafter, hexadecimal values 0, 1, 9 and 8 are initially to be excluded from coefficient nibbles. Accordingly, there are $(12)^n$ possible combinations to form a tap coefficient A when using n nibbles. Added to this are "end sequences" employing 0, 1, 9 and 8, as will be explained hereinafter, producing $4*(12)^{n-1}$ possible end combinations. In addition, there are "tail sequences" employing 0 and 8, producing $$2 * \left[ \frac{\left( \sum_{J=0}^{n-2} 2 * J * (12)^J \right)}{J} + 2 \right]$$

possible tail combinations.

Accordingly, the total number of useful combinations is given by the formula $$(12)^n + [4 * (12)^{n-1}] + 2 * \left[ \frac{\left( \sum_{J=0}^{n-2} 2 * J * (12)^J \right)}{J} + 2 \right] \qquad (4)$$

Thus, Equation (4) represents the total number of decimal values possible for a filter tap coefficient A with n nibble coefficients, each being a four-bit (sign + three-bit) binary quantity. For instance, for $n=2$, there are 196 possible tap coefficient values; for $n=3$, there are 2,356 possible tap coefficient values.

For illustrative purposes only, the coefficient updating method of the present invention will be described in terms of a filter each tap of which has three 4-bit hexadecimal "nibble" coefficients C1, C2 and C3, the most significant being C1 and the least significant being C3. Each coefficient nibble consists of a sign bit S and a three-bit shift code M so that $$Ci = SiMi$$

$$i = 1, 2, 3.$$

The convention regarding the sign bit, for this description of the method, is that $Si = 1$ indicates a negative coefficient value and $Si = 0$ indicates a positive coefficient value; the values are represented in a one's complement notation. This results in a range of values for each nibble of $+1$ to $-1$. In this way, the decimal value of a particular tap coefficient A is given by the formula $$A = S1 * 2^{-M1}(1 + S2 * 2^{-M2}(1 + S3 * 2^{-M3})). \qquad (5)$$

Since each filter tap coefficient has three 4-bit coefficients, there are 4,096 possible tap coefficient values in all. The particular values described above will be used in this description, but other values can be used within the scope of the present invention.

Using the Canonic Signed Digit (CSD) encoding of these 4,096 values, many of the tap coefficient values are repeated or do not form part of a sequential pattern suitable for use by counters. By not allowing C2 and C3 to take on the values 0,1,9 or 8, and omitting repeated values, a sequential pattern of 2,304 possible CSD encoded values results. The resolution between adjacent values in the resulting 2,304 values is very small and eliminating the codes omitted from the 4,096 values has a negligible effect on the overall resolution of a tap coefficient A.

However, restricting the CSD encoded values to 2,304 values does not allow the resulting tap coefficient A to reach $+3$ or $-3$, as would result from a direct application of equation (5). An additional 26 CSD encoded values are placed on each of the values, making a total of 2,356 possible CSD encoded values. These added codes fit into the pattern of the original 2,304 values, by allowing C2 and C3 to take on additional codes outside their normal range, i.e., they take on values 0 and 1.

According to the present invention then, the values that each hexadecimal coefficient can take are as follows:

| | Most Positive Decimal Value | | | | | | | | | | | | Most Negative Decimal Value | | |
|---|---|---|---|---|---|---|---|---|---|---|---|---|---|---|---|
| C1: | 0 | 1 | 2 | 3 | 4 | 5 | 6 | 7 | F | E | D | C | B | A | 9 | 8 |
| C2: | 0 | 1 | 2 | 3 | 4 | 5 | 6 | 7 | F | E | D | C | B | A | | | restricted to end points only, when C1 = 0 or 8

| C3: | 0 | 1 | 2 | 3 | 4 | 5 | 6 | 7 | F | E | D | C | B | A | restricted to end points only, when C1 = 0 or 8

-continued

| Most Positive Decimal Value | Most Negative Decimal Value |
|---|---|
| | and C2 = 0 or 8. |

In accordance with these observations, the coefficient update according to the present invention mandates the following conditions on the 4-bit coefficients C1, C2 and C3:

(I) C1 may take on all sixteen hex values 0 through 8, shown above.

(II) C2 may take on the twelve hex values 2 through A, shown above, except that when C1=0 or 8, i.e., M1=0, it can take on the values 1 and 0. C2 never takes on the values 9 or 8.

(III) C3 may take on the twelve hex values 2 through A, shown above, except that when C1=0 or 8 and C2=0 or 8, i.e., M1=0 and M2=0 it can take on the values 1 and 0. C3 never takes on the values 9 or 8.

(IV) When C2 changes sign, the C3 sequence changes direction.

(V) When C1 changes sign, the C2 and C3 sequences change direction.

If the sign bit S is omitted from the shift code M, the sequence of M values form a loop:

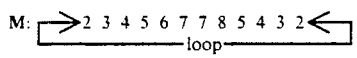

This sequence forms the basis of the coefficient update of the present invention. A typical incrementation or decrementation sequence is illustrated in FIG. 4A for 3 nibble CSD format. The diagram shows the movement through the coded tap coefficient values for a particular value of C1 and variable value of C2 and C3 in terms of the shift codes M1, M2 and M3. To restrict the size of the figure, only the representative values of M2 equal to 3, 4 and 5 are shown. However, the pattern shown repeats for all values of M2. The value of M1 is shown in FIG. 4A as "x" which stands for any hexadecimal value that M1 can take on, i.e., "don't care".

FIG. 4B diagrammatically illustrates how the signs S1 and S2 of the coefficients C1 and C2 determine the direction of movement through the coded tap values C2 and C3. A ± pattern in FIG. 4B indicates movement in the direction from most positive decimal value to most negative decimal value while a ∓ pattern indicates movement in the direction from most negative to most positive. Selection of the direction of movement is therefore given by the exclusive-OR (ex-or) function; for example for C3:

| C1 | C2 | C3 |
|---|---|---|
| − | + | + |
| − | − | − |
| + | − | + |
| + | + | − |

The coefficient update method described in terms of three nibble coefficients C1, C2 and C3 can be extended to n nibble coefficients C1, C2, ..., Cn in the following manner: the restrictions imposed on coefficient C3 in condition III, supra, also are imposed on coefficients C4, ..., Cn. Condition IV is generalized to: when Cn-1 changes sign, sequence Cn changes direction and condition V is generalized to: when C1 changes sign, the C2, C3, ..., Cn sequences change direction.

With reference again to FIG. 1, filter 10 receives signals which are to be transmitted to a near-end receiver. These signals Xn are conducted on a signal line 12, and are digitally-encoded voice or data signals, as will be appreciated by those skilled in the art. Signals on line 12 are conducted to filter 10 as well as to a block 14. Signals generated by block 14 are then conducted to a four-wire terminating set 16 commonly known as a subscriber line interface circuit (SLIC) which interconnects to a two-wire transmission line 18 and finally to the near-end receiver 20. Block 14 represents all the circuits of the transmit side between the input of filter 10 and four-wire terminating set 16. Block 14 will have a transfer function represented by Hi(Z). For reference purposes hereinafter, the input to filter 10 is denoted by "A" in FIG. 1.

Signals received over line 18 are conducted to the four-wire terminating set 16 and then to a block 22, which represents all the circuits of the receive side between the four-wire terminating set 16 and a summing input of a sum node 24. Block 22 has a transfer function Hj(Z). The signals generated by echo-cancelling filter 10 are applied to a subtracting node of sum node 24. The difference between the signals applied to sum node 24 are therefore generated as error signals En at an output of sum node 24. For reference purposes hereinafter, the output of block 22 is denoted by "B" in FIG. 1.

The desired steady-state response dn of the signal generated at sum node 24 to a sinusoidal signal with amplitude DBV $$d_n = DBV * M(wi) * \sin(wiT - \phi(wi)) \quad \text{(Equ. 4)}$$

where DBV is the input signal level applied to filter 10, wi is the frequency of the signal applied and DBV*M(wi) is the desired echo-cancelling amplitude response between points A and B to the applied signal and φ(wi) is the desired echo-cancelling phase response.

Filter 10 generates a signal given by $$Y_n = DBV * bni * xni \quad \text{(Equ. 5)}$$

and the error signal actually generated by sum node 24 is then $$E_n = d_n - Y_n = DBV * (M(wi) * \sin(wiT - \phi(wi)) - bni * Xni) \quad \text{(Equ. 6)}$$

According to Equ. 6, the magnitude DBV does not affect the sign of the error signal, nor will it control or influence the convergence of an update algorithm. The update algorithm accordingly depends on the sign of the error signal and not the level of the error signal: the input level DBV alters the error ($E_n$) signal amplitude. Error signal $E_n$ is provided to filter 10 via line 15.

The use of the CSD update algorithm is accordingly particularly suited to adaptive filter 10 because it relies solely on the sign of the product of $X_n$ and $E_n$, as determined by the exclusive-OR function.

The error ($E_n$) is initially equal to the input signal $d_n$. $E_n$ decreases as filter 10 adapts to the particular line conditions and finally approaches a residual limit. Once the filter has adapted, the residual error will oscillate about a small value.

In simulated adaptions using white noise as input $X_n$ and the CSD update algorithm for the coefficients of filter 10, convergence to the residual limit is obtained within approximately 5000 iterations.

In order to avoid oscillations of the non-linear CSD filter coefficients after convergence, filter 10 preferably includes a user-selectable error threshold voltage (Kv). After every iteration in updating the filter coefficients, error $E_n$ is compared against Kv; if $E_n$ is less than Kv then no coefficient updating will be performed.

In an alternative to the use of the error threshold voltage Kv, a relative error threshold voltage value, a, is used, where a is a user-selectable 3-nibble CSD coefficient. The relationship between Kv and $X_n$ is given by $Kv = a^* |X_n|$.

$$a = \left| \frac{E_n}{X_n} \right|. \qquad \text{(Equ. 7)}$$

If $|E_n| < a^* |X_n|$, then no adaptation of filter 10 is made.

The Echo Return Loss (ERL) is given by $$ERL = 20 \log \left| \frac{E_n}{X_n} \right| = -Y \, dB \qquad \text{(Equ. 8)}$$

for some value Y.

Substituting a for $$\left| \frac{E_n}{X_n} \right|$$

gives $$ERL = 20 \log a = -Y \text{ or} \qquad \text{(Equ. 9)}$$

$$a = 10^{\frac{-Y}{20}}$$

Accordingly, if a user wants $-Ydb$ for ERL, then a is given by Equ. 9. In simulated adaptions, a value of $-20$ dB for Kv has been employed.

With reference now to FIG. 2, the effect of a near-end talker will now be described. The preceding description of the invention has been directed only at the presence of a far-end talker and the cancellation of echos therefrom. If there is another talker at the near end, the error $E_n$ becomes a function of both near-end and far-end signals and meaningless for updating coefficients in the adaptive filter 10. Accordingly, the adaptive filter must be inhibited from updating any time a near-end signal is present.

A near-end speech or signal can be detected by an energy-averaging filter 26 shown in FIG. 2. (Elements of FIG. 2 in common with FIG. 2 are denoted by the same reference numerals.) The signal on line 12 applied to adaptive filter 10 (at point A) is also conducted to one pole of a sampling switch 28. The signal applied to the summing input of sum node 24 (at point B) is also connected to a second pole of switch 28. The signals at points A and B are denoted Ai and Bi.

A near end speech or signal is detected by sampling the Signals Ai and Bi applied to switch 28. Energy-averaging filter 26 has an input terminal connected to the moveable contact of switch 28 and can accordingly sample the signals Ai and Bi over time.

Energy-averaging filter 26 contains a low-pass filter, which will be described hereinafter in connection with FIG. 3, which receives signal Ai or Bi and generates a low-pass filtered version $\sim Ai$ and $\sim Bi$, respectively, of the absolute value of the signal Ai or Bi, depending on the position of switch 28. The signals $\sim Ai+1$ and $\sim Bi+1$ are related to $\sim Ai$, $\sim Bi$, Ai and Bi according to $$\sim A(i+1) = \beta \sim A(i) + \alpha |A(i)|$$

$$\sim B(i+1) = \beta \sim B(i) + \beta |B(i)| \qquad \text{(Equ. 10)}$$

where $\alpha$ and $\beta$ are the low-pass filter coefficients which will be described in connection with FIG. 3.

Due to unknown line delay, a near end speech or signal is detected if $$8 \sim Bi > = \gamma \cdot \max[\sim A(i), \sim A(i-1), \ldots, \sim A(i-N-1)] \qquad \text{(Equ. 11)}$$

where $\gamma$ is the echo-path loss through 4-wire terminating block 16.

An ALU would receive the signal YAV(nt) generated by energy-averaging filter 26 via line 44 and would implement Equ. 11 via line 42 as will be appreciated by those skilled in the art. In a simulation, $\gamma$ is determined at a frequency of 1,000 Hz. The ALU would be connected to adaptive filter 10 and would inhibit coefficient updating at any time Equ. 11 indicates detection of near end speech or signals.

With reference now to FIG. 3, energy-averaging filter 26 is preferably realized as a two-tap single-pole low-pass digital filter. Signals sampled by switch 28 X(Z) are conducted to a multiplier node 30 which also receives the filter coefficient $\alpha$. The signal generated by multiplier node 30 is conducted to an input of a sum node 32. Sum node 32 generates a signal conducted to delay 34. The delayed signal is conducted to a multipler node 36 which also receives the filter coefficient $\beta$. The signal generated by multiplier node 36 is conducted to a second input of sum node 32. The low-pass signals Yav(nT) are generated at the output of filter 26 as the signals generated by sum node 32.

The low-pass filter 26 of FIG. 3 thus implements one of the equations 10, depending on whether sampling switch 28 is connected to point A or point B.

Low-pass filter 26 realizes the frequency-domain transfer function $$H(Z) = \frac{\alpha}{1 - \beta Z^{-1}} \qquad \text{(Equ. 12)}$$

In a preferred embodiment, $\alpha = 0.00975$ and $\beta = 0.990234$.

We claim:

1. An apparatus adaptable for use in a communication system at a communication station having a receive line for receiving an incoming signal and a transmit line for transmitting an outgoing signal, the apparatus comprising:

a summer means for summing said outgoing signal with an echo correction signal and producing a corrected output signal representative of said outgoing signal on an output line; and a digital filter means for producing said echo correction signal;

said digital filter means being operatively connected to said receive line, said summer means, and said output line;

said digital filter means comparing said incoming signal with said corrected output signal to determine said echo correction signal representing the difference between said incoming signal and said corrected output signal;

said digital filter means employing a canonic signed digit algorithm to incrementally alter said echo correction signal to produce a first iteration echo correction signal;

said incoming signal comprising a plurality of incoming signal bits;

said digital filter means effecting said incremental alteration by applying a respective incoming signal bit of said plurality of incoming signal bits to a respective filter tap, each said respective filter tap altering its respective incoming signal bit according to a respective filter tap coefficient, a value for each said respective filter tap coefficient being defined by said canonic signal digit algorithm;

said digital filter means continuing said comparison and said incremental alteration until said corrected output signal is within a predetermined value of zero.

2. An apparatus adaptable for use in a communication system as recited in claim 1 wherein the apparatus further comprises signal averaging means for sampling and comparing said incoming signal with said outgoing signal, and logic means for controlling said digital filter means;

said signal averaging means being operatively connected to said receive line and said transmit line and producing a comparison signal to said logic means;

said comparison signal being representative of the difference between said incoming signal and said outgoing signal;

said logic means allowing and inhibiting said incremental alteration in response to said comparison signal.

3. An apparatus adaptable for use in a communication system as recited in claim 2 wherein said logic means inhibits said incremental alteration when said comparison signal indicates that said outgoing signal is equal to or greater than said incoming signal.

4. An apparatus adaptable for use in a communication system as recited in claim 1 wherein said digital filter means alters said value for each said respective filter tap according to said canonic signed digit algorithm by effecting a bit shift in a direction according to a sign, said sign being appropriate to reduce said corrected output signal.

5. An apparatus adaptable for use in a communication system as recited in claim 4 wherein said canonic signed digit algorithm directs alteration of said value for each respective filter tap coefficient according to a relationship, said relationship being:

$$h_i = B_1 2^{-M_1} + B_2 2^{-M_2} + \ldots + B_n 2^{-M_n}$$

where $M_i$ = number of said bit shifts and $M_i < M_{i-1}$,
$B_i$ = said sign, and $B_i = \pm 1$,
n = number of said respective filter tap coefficients.

* * * * *